United States Patent
Pinnow et al.

[11] 3,853,384
[45] Dec. 10, 1974

[54] OPTICAL TRANSMISSION LINE

[75] Inventors: Douglas Arthur Pinnow, Berkeley Heights; LeGrand Gerard Van Uitert, Morris Township, Morris County, both of N.J.

[73] Assignee: Bell Telephone Laboratories, Incorporated, Murray Hill, N.J.

[22] Filed: Apr. 16, 1973

[21] Appl. No.: 351,168

[52] U.S. Cl. ............. 350/96 WG, 65/3, 65/DIG. 7, 350/96 R
[51] Int. Cl. ............................................. G02b 5/14
[58] Field of Search .................. 350/96 WG

[56] References Cited
UNITED STATES PATENTS

| | | | |
|---|---|---|---|
| 3,647,406 | 3/1972 | Fisher | 350/96 WG X |
| 3,659,915 | 5/1972 | Maurer et al. | 350/96 WG |
| 3,737,293 | 6/1973 | Maurer | 350/96 WG UX |
| 3,753,157 | 8/1973 | Ash et al. | 350/96 WG X |

*Primary Examiner*—John K. Corbin
*Attorney, Agent, or Firm*—G. S. Indig

[57] ABSTRACT

Optical transmission line suitable for transmitting electromagnetic radiation within the visible spectrum and adjoining portions of the infrared and ultraviolet spectra consists of an alumina-doped borosilicate core and clad by an undoped borosilicate. Intrinsic insertion loss is lowered relative to a similar structure using undoped silica as the core material. Interfacial regions between core and clad may be sharply defined or graded.

16 Claims, 3 Drawing Figures

PATENTED DEC 10 1974

3,853,384

TRANSMISSION LINE 3,853,384

OPTICAL TRANSMISSION LINE

BACKGROUND OF THE INVENTION

1. Field of the Invention

The invention is concerned with glass transmission lines for use with a visible and near visible spectra.

2. Description of the Prior Art

Recent technical literature reflects increasing activity and significant advances in optical communication systems. Much of the purported work in recent months concerns the transmission line medium which for years has lagged behind other elements, such as the oscillator, isolator, modulator, detector, etc.

Initial interest in optical communications took the form of the expected increased bandwidth attendant upon high carrier frequencies relative to the then developing microwave systems. More recently, interest has, to a large extent, centered on the space-saving attributed to recently developed small cross section lines. These lines, which may take the form of glass fiber, may be a cross section of the order of 100 micrometers or less for other single mode or multimode structures with expected bandwidth capacity comparable to coaxial microwave lines. By comparison, coaxial microwave lines of the same bandwidth capability may be of the order of 1 centimeter in diameter. Most likely, initial use will be in congested urban areas where underground duct space is at a premium.

While many compositions have been tested, the best developed at this time is silica or modified silica. One clad structure capable of multimode transmission with an insertion loss of the order of 5 dB/km or less at bands in the infrared was recently announced. (R. D. Maurer (Corning Glass Works), Report at European Electro-Optics Markets and Technology Conference, Switzerland, September, 1972.) This structure utilizes a pure silica clad and a doped silica core. Doping of the core was required to increase the refractive index relative to the clad, so as to meet the usual design requirement of stepped or graded decrease in refractive index from core to clad of at least 0.1 percent.

A more recent advance took advantage of the unexpected finding that boron oxide and silicon oxide, while individually of approximately equal refractive index, evidenced lowered values of 0.1 percent or greater when mixed. This finding permitted structures utilizing pure silica cores with the required lowered index being produced in the clad by use of the mixed borosilicate composition. See U. S. Pat. No. 3,778,132 issued Dec. 11, 1973.

A related work conducted during the same period resulted in the development of a fundamental relationship between insertion loss and the various contributing loss contributions. (See D. A. Pinnow et al. "Fundamental Optical Attenuation Limits in the Liquid and Glassy State with Application to Fiber Optical Waveguide Materials," Appl. Phys. Letters, Vol. 22, No. 10, page 527, May 15, 1973.) While this work was quite general and considered many contributions, two particularly significant relationships were reported. One of these identified a Rayleigh scattering contribution as due to the state of disorder of the transmission material at the formation temperature. Accordingly, it was found that the lower disorder corresponding with lower glass transition temperatures (or more generally solidification temperatures) resulted in a lowered scattering contribution from this mechanism. The lower molecular disorder associated with a lower glass transition temperature has also been determined to be desirable in reducing intrinsic optical absorption caused by disorder broadening of the exciton absorption bands. These bands are generally centered in the ultraviolet but they tail off throughout the visible portion of the spectrum and continue on out into the infrared. The magnitude of the absorption due to this mechanism in the red and near infrared where optical communications appear most promising is comparable to that of the intrinsic scattering loss. Generally, the lower the glass transition temperature the lower the intrinsic absorption will be. Another factor which influences the magnitude of this intrinsic absorption is the spectral position of the exciton bands. The greater the spectral displacement of these band centers from the optical communication band(s) the less they will influence absorption. Thus, the exciton bands should be centered as far out into the ultraviolet as possible. This is equivalent to saying the glass should have as large an energy gap as possible. It is fortunate that large energy gaps are generally associated with low refractive index (S. H. Wemple and M. DiDomenico, Jr., "Optical Dispersion and the Structure of Solids," *Physical Review Letters*, Vol. 23, pp. 1156–1160, Nov. 17, 1969) since it has also been determined that intrinsic scattering loss varies as the eighth power of the refractive index.

While it has been known for some time that insertion loss due to scattering showed an increase with increasing refractive index, no previous writing suggested the relationship to be as pronounced. This fundamental work prompted inquiry into materials of lowered glass transition temperature and high energy gaps. There is also a very practical advantage associated with lower glass transition temperature. This is due to the relative ease in manufacturing. For example, it is noted that almost all commercial glass products have glass transition temperatures in the range of 400°C. to 700°C. simply because it is easier and thus cheaper to make such glasses. One immediate outgrowth was the serious consideration of low softening point, water soluble materials which had been largely ignored due to the need for protecting them from normal atmospheric humidity. See U.S. Pat. No. 3,722,981 issued Mar. 27, 1973.

DETAILED DESCRIPTION

1. General Considerations

Figure 1:
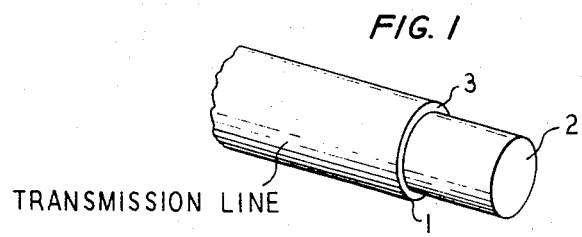
FIG. 1 is a perspective view of a section of a transmission line structure in accordance with the invention.

Based on theoretical and experimental studies, the intrinsic contributions to insertion loss in glass optical transmission lines have recently been identified. These mechanisms are all associated with the random structure of the glassy state and are summarized as follows:

I. Scattering Loss a. Density fluctuation associated with the random structure;

b. Random orientation of molecules which are not spherically symmetric;

c. Random molecular mixing of the components in a multicomponent glass.

II. Absorption Loss

Due to microelectric fields associated with the random structure (5 *Phys. Rev. B*, 594 (January 1972)) such microfields cause a broadening of the exciton absorption bands. Exciton bands generally center at ultraviolet frequencies. Loss for this mechanism continues to be of significance in the tail region at infrared frequencies.

Near intrinsic scattering and absorption losses in pure fused silica in the red and near infrared wavelengths have been measured. Levels are 5 dB/km at 0.7 μm, 3 dB/km at 0.8 μm, and 1.2 dB/km at 1.06 μm.

Core compositions in accordance with the invention result in low insertion loss due to a number of characteristics. Addition of boron oxide to silicon oxide results in a significant decrease in glass transition temperature $T_g$, for example, the 3:1 $SiO_2/B_2O_3$ composition has $T_g$ value of about 400°C. as compared to 1400°C. for $SiO_2$ alone. The value of $T_g$ is only slightly affected by the small alumina inclusion. This results in low scattering loss due to density fluctuations resulting from the "frozen in" disorder and also reduces the microelectric fields, thereby minimizing intrinsic absorption as discussed in II. above.

The oscillator energy, $E_o$, which is closely related to the energy gap in silica is large, about 13.4 ev. (See S. H. Wemple, *Phys. Rev.*, Vol. B15, April 1973.) The gap is decreased only slightly by $B_2O_3$ inclusion (a value of about 13.1 ev has been recently measured for the 3:1 composition). Alumina inclusion has only a small effect and tends to increase the gap slightly. As discussed, location of exciton absorption bands in the untraviolet results in relatively small absorption in the longer frequencies generally contemplated for communication purposes.

Index adjustment resulting from inclusion of additional components invariably increases scattering losses. A large part of the insertion loss in the prior art titania modified silica core was due to this factor. In that instance, loss was increased due to the large difference in refractive index (~2.7 for $TiO_2$ and ~1.46 for $SiO_2$). An inherent advantage of the $B_2O_3/SiO_2$ system is the very close index matching of these two ingredients (1.4585 for $SiO_2$ and 1.4582 for $B_2O_3$ at a wavelength of 0.589 μm). $Al_2O_3$ with its index of ~1.6 for that wavelength has only a small effect on this scattering contribution.

2. The Drawing

Figure 2:
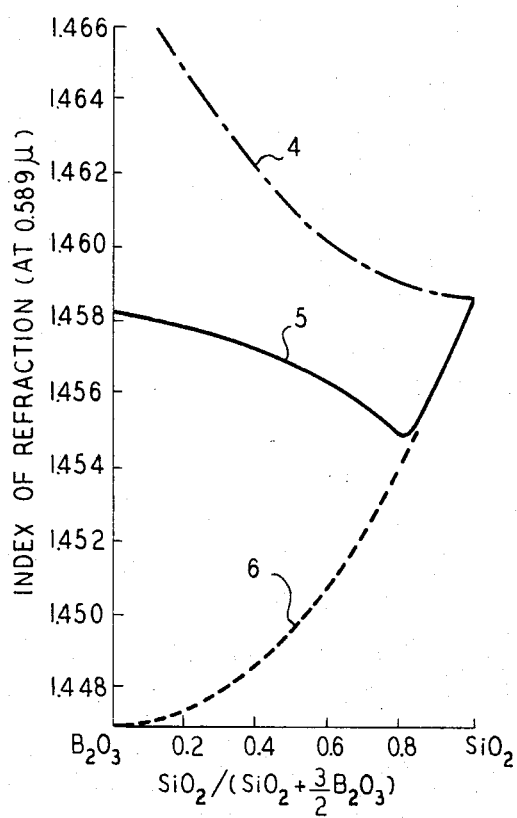
FIG. 2, on coordinates of index of refraction, $\eta$ (at 0.589$\mu$m) versus the composition parameter $SiO_2/(SiO_2 + 3/2\ B_2O_3)$, is a plot of $\eta$ versus composition line (4) as expected for fully annealed samples, line (5) as found for furnace cooled samples, and line (6) approximately as found for rapidly quenched samples such as drawn fibers.
Figure 3:
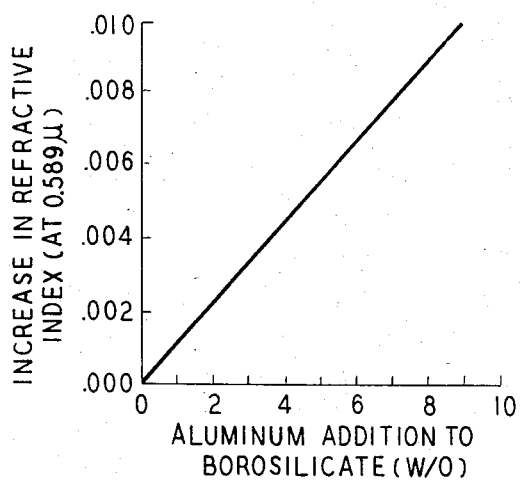
FIG. 3, on coordinates of increase in refractive index, $\Delta\eta$ (at 0.589 $\mu$) versus aluminum additions to borosilicate glasses, is a plot showing that $\Delta\eta$ is proportional to the weight percent of aluminum present.

FIG. 1 depicts a portion of an optical transmission line 1 constructed of a core section 2 of modified $B_2O_3/SiO_2$ (e.g., by use of $Al_2O_3$ or other index-increasing constitutents) and a guiding section as cladding 3 composed of $B_2O_3$-modified $SiO_2$. Guiding section (cladding 3) may, as discussed, be a single layer of substantially uniform index or two or more layers with each successive layer being of lower index than that underlying so as to approximate a parabolic gradient of particular utility for multimode structures. Cladding 3 may itself, in the alternative, be of graded composition. Not shown is an exemplary means for introducing and-/or extracting wave energy into line 1. (In this instance) this means may consist of a section of closely matching index, and may constitute a coupling between line 1 and a transmitting or detecting means not shown. An additional layer not shown may be a shielding layer designed to avoid crosstalk between adjoining lines or other layer included, for example, for structural rigidity if of fabrication, etc. A suitable shielding may consist of any highly absorbent material which is absorbent of the wave energy being transmitted. Exemplary shielding materials for operation in the visible and near-visible spectra are carbon impregnated polyethylene, vapor deposited chrome metallization, and black pigmented polyester resin or paint. While the form of data presented in FIG. 2 is fairly representative for the entire visible spectrum, as well as portions of the near infrared and near ultraviolet for which $SiO_2$ compositions are sufficiently transparent, the actual numbers are those for a refractive index $\eta$ near 0.589 micrometers. Terminal values indicated are approximately 1.4585 for furnace cooled $SiO_2$ and 1.4582 for furnace cooled $B_2O_3$ (curve 5). Mixtures of the two materials result in a lowering of $\eta$ for furnace cooled materials over the entire range and reach a minimum of approximately 1.4545 at a value of $SiO_2/(SiO_2 + 3/2\ B_2O_3)$ of 0.8. This corresponds with an $SiO_2:B_2O_3$ ratio of 6:1. Compositions in a range centering about this minimum, prepared as described in the Detailed Description, are substantially free of absorption attributable to $H_2O$ or OH content. FIG. 3 illustrates the increase in index attendant upon alumina modification of a $B_2O_3/SiO_2$ mixture. As a first approximation, admixture of alumina with $SiO_2/B_2O_3$ glasses, as contemplated, results in an increase in index of approximately $10^{-3}$ for each 0.86 weight percent of included amount of $Al_2O_3$.

3. Composition

Core and clad compositions both are basically $B_2O_3$-modified fused silica. The useful range based on the mole fraction $SiO_2/B_2O_3$ is from 30:1 to 2:1 with a preferred range from 8:1 to 2.5:1. The highest silica ratio is prescribed by the desire to reduce the glass transition temperature by a significant amount and this limit corresponds with the decrease to 725°C. The lower silica ratio limit is prescribed by the fact that low silica containing glasses tend to become attacked by water and moisture.

The general shape of the relevant refractive index—composition relationship—is unaffected by the amounts of index-increasing constituent added. Basically, clad compositions are so specified; although particularly where graded index structures are utilized, the "clad" may be considered as including regions with some alumina or other index-increasing constituent.

So the effect of one weight percent $Al_2O_3$ addition is to increase the index by approximately 0.1 percent over the entire broad range of $SiO_2/B_2O_3$ specified. Discussion in terms of index-increasing is in terms of alumina addition. While this is certainly the exemplary material, other materials may be substituted. The general requirement for the index-increasing additive is that it not substantially increase scattering loss due to concentration fluctuations when added to the borosilicate glass. It is further desirable, though not essential that the additive increase the energy gap. $Al_2O_3$ has been found to be desirable on basis of both of these requirements. However, other additives such as $Li_2O$, $Na_2O$, $K_2O$, CaO, etc. should also be useful. These latter additives all decrease the energy gap somewhat so that $Al_2O_3$ is definitely preferred.

The usual range of alumina doping is from about one weight percent to 20 weight percent based on the entire composition; while the preferred range on the same basis is from two weight percent to 10 weight percent. The lower limit is necessary to produce the minimum useful index differential between core and clad. The upper limit comes about from fundamental considerations relating to insertion loss due to the excess scattering due to concentration fluctuations. While greater values of alumina may still be of benefit due to the decrease in density fluctuation scattering loss due to the low $T_g$ relative to $SiO_2$, maximum benefit is obtained within the designated range.

The above ranges and other considerations are applicable both to structures utilizing step junctions between core and clad, as in the usual single mode line, and also to graded structures as are desirably utilized for multimode transmission.

OTHER INCLUSIONS

The invention has been discussed in terms of the essential compositions. As noted, the lower index clad material is a boron oxide-silicon oxide glassy composition, while a higher index core is constructed of a mixture of the same two components, however, modified to increase the index by an appropriate amount and to optimize the match in thermal expansion. While the index relationship may to a cetain extent be the result of appropriate choice of relative amounts of the majority constituents in the two functional portions of the line, increasing index in the core is largely the result of a third ingredient. In the exemplary case, this third ingredient is aluminum oxide $Al_2O_3$ for the reasons noted. Alternative materials may be utilized in which case such materials should, for the reasons noted, have refraction coefficients which are within 30 percent of the average for the unmodified core composition at the wavelength of concern. (For the wavelength range of general interest, the effective admixture is essentially linear so that the maximum index deviation noted may be considered a general value.) Examples of such alternative materials are $Li_2O$, $Na_2O$, $K_2O$, and CaO. There is no objection to utilizing two or more index-increasing materials, although compositional control is expedited by use of but one. As set forth above, many of the advantages of the inventive structure are directly related to the glass transition temperature which is lowered relative to other core materials such as, for example, in unmodified silica. Choice of an alternative index-increasing component may be dependent on the desire to stay within this prescribed $T_g$ value and may also take into account other of the considerations noted—such as, bandgap, etc.

With respect to unintentional inclusions, requirements are based on the intended function of the structure. Therefore, inclusions in amount and kind that have a significant deleterious effect on transmission quality (scattering or absorption) at the wavelength to be transmitted should be avoided. In terms of end result, since use of a structure of the invention may generally result in inherent improvement of the order of 0.5 dB/km or greater, impurity level must be kept sufficiently low so as not to result in a loss contribution of that magnitude. In general, good laboratory procedure for the preparation of optical glass elements results in a total transition metal ion impurity level on the order of less than $10^{-5}$ percent by weight based on the entire composition and such is adequate for purposes of the invention.

It is well known that a typical loss characteristic in the infrared is due to a harmonic of the fundamental $OH^-$ absorption. In the near infrared, the third harmonic absorption centers about 0.95 $\mu$m wavelength as measured in vacuum. Assuming operation at a wavelength near 1.06 $\mu$m, $OH^-$ level content of below 0.2 percent by weight is considered sufficient. A value of extinction coefficient of 20 $cm^{-1}$ at 2.8 $\mu$m corresponds with this level.

An advantage of the inventive system is closely matched thermal expansivity likely to be within $0.5 \times 10^{-6}/°C$ for core-clad compositions differing only by the inclusion of an index-increasing constituent in the core. In fact, by minor variations in the $SiO_2:B_2O_3$ ratios in the core and cladding materials it is possible to produce exact matches in thermal expansivity. In practice the difference in expansivities may increase to a maximum of about $2 \times 10^{-6}/°C$ for extreme compositions within the acceptable ranges indicated. Fabrication for mismatch of this magnitude is not considered a significant engineering problem. Another factor to be considered in the choice of core and cladding compositions is the difference between their respective glass transition temperatures. Experience in fabricating optical fibers from bulk glass preforms has shown that it is desirable for the outer cladding material to soften at the fiber drawing temperature no greater than the inner core. This is important in order to eliminate the tendency of the cladding to "run" or flow away from the core. This means that it is desirable to adjust compositions in such a way that the glass transition temperature of the cladding is equal to or greater than the core transition temperature. If this is not done, fibers can still be produced by inserting both the core and the cladding into an outer glass jacket of sufficiently high transition temperature to restrict the flow of the cladding. Of course, it would be preferred not to have this complication.

4. Material Preparation

Glassy material for use in core or clad may be prepared by any of several techniques. A conventional procedure for the preparation of optical quality silica glass is, for example, set forth in 5, *Journal of Non-Crystalline Solids*, 123–175, North-Holland Publishing Company (Nov. 1970).

A test procedure found acceptable for the preparation of bulk material involves milling the oxides together overnight in a plastic jar using plastic-coated spinners. Milled material was loaded into platinum crucibles and heated at a temperature of 1350°C for several hours to bring about at least partial fusion. Fused materials were then again heated this time within a range of 1500° to 2,000°C, depending on $SiO_2$ content, in an iridium crucible. Cooling to room temperature was conveniently achieved by turning off the power to the melt furnace. The effective cooling rate was ~50°C/min. Test samples were then cut out of the solidified fused mass and were polished to suitable dimensions for preform fabrication or measurement.

5. Transmission Line Fabrication

The preform assembly is supported in a fixture attached to a feed mechanism, for positioning in a source of heat sufficient to soften the glasses. Examples of heat sources include resistance furnaces, gas torches, noble gas plasmas, lasers and image focusing devices.

An alternative procedure of preform fabrication utilizes the general techniques described in D. B. Keck et al., U. S. Pat. No. 3,711,262 issued Jan. 16, 1973. In accordance with this procedure, clad and/or core may be prepared by chemical vapor deposition (CVD) by use of silane-borane-oxygen mixtures sometimes containing index-increasing material, as, for example, $AlCl_3$. Such precursor material usually diluted with an inert gas such as nitrogen or carbon dioxide is passed over a heated surface upon which deposition is to proceed. Deposition may be on a solid core or within a hollow tube. It may be carried out in several stages so as to permit desired build up or to permit formation of a gradient corresponding with changing gaseous composition, particularly where deposition is within a tube (which may be a member separate from clad and core and which may be retained or removed during subsequent fabrication). The preforms obtained by either method of fabrication may be subsequently collapsed to produce a bubble-free solid body which is then locally melted and transformed into the final fiber line by drawing.

6. Design Considerations

The following considerations are applicable to the design of any clad optical transmission line. While much of the information is in the literature, it is not readily available from one source.

Of the host of potential fiber designs that are being considered, one stands out as having recognized simplicity and good light guiding characteristics. This is the core-clad fiber shown in FIG. 1 in which the index of refraction of the core is $\Delta\eta$ greater than the index of refraction of the cladding $\eta$. By appropriate choice of the core radius, $a$, and $\Delta\eta$, this type of fiber can be either single or multimode. In either case, most of the optical energy of the guided modes is in the core region, although a fraction of the power (~20 percent for single mode and 1 to 2 percent for a highly multimode structure) is in the cladding. The overall optical attenuation, $\alpha_{tot}$, for such a fiber is a superposition of the weighted attenuations in core and cladding materials:

$$\alpha_{tot} = (\text{percent of optical energy in core})\alpha_{core} + (\text{percent of optical energy in clad})\alpha_{clad} \quad (1)$$

For highly multimode core-clad fibers, each of the many guided modes has a well-defined velocity of propagation. The fastest mode has its energy directed straight down the axis of the fiber. The off axis modes are slower because their energy is reflected from the core-clad interface many times as they weave their way down a long fiber. This difference in mode velocities limits the information bandwidth (or bit rate) of fiber optical waveguides, since energy in an extremely narrow pulse of light directed into the various guided modes of a fiber will be spread out in time as the energy propagates down the length of the fiber. When the spreading reaches the point where adjacent pulses in a bit stream sufficiently overlap, the transmitted information is lost.

Based on well-known principles it can be shown, that the information bandwidth of a highly uniform and highly multimode fiber is related to the difference in refractive indices between the core and the clad. Specifically, $$\Delta\eta \leq c/L \times B \quad (2)$$

where $c$ is the velocity of light ($3 \times 10^5$ km/sec), $L$ is the length of the fiber, and $B$ is the maximum information bandwidth. For example, in order to transmit a bandwidth of 30 MHz over a relatively short distance of 1 km, the value of $\Delta\eta$ must be 0.01 or less. It is apparent from the above equation that long distance and broadband transmission require small values of $\Delta\eta$. In fact, the smaller the better. Unfortunately, if $\Delta\eta$ becomes too small, the guided light will tend to "leak" excessively out of the fiber when it passes minor fabrication imperfections which inevitably occur during manufacture. The smaller $\Delta\eta$, the greater this loss effect becomes. Thus, to keep optical loss to a reasonable value, $\Delta\eta$ must have some minimum value.

For communication applications, the useful range of $\Delta\eta$ is between 0.0001 and 0.10; and the preferred range is between 0.001 and 0.02. It should be noted that the $\Delta\eta$ of the core and the preferred composition clad of the invention is in the preferred range.

Although the above discussion concerns only multimode fibers, useful and preferred ranges for $\Delta\eta$ are also applicable to single mode core-clad fibers. In the case of the single mode fibers, the reason given above for the lower limit on $\Delta\eta$ is still applicable. However, there is obviously no pulse broadening effect due to differences in mode velocities so that Eq. (2) cannot be used to set an upper limit on $\Delta\eta$. In this single mode case the upper limit is due simply to the fact that the fiber core radius, $a$, is constrained to $$a \lesssim \lambda/4 \sqrt{2\eta\Delta\eta} \quad (3)$$

where $\lambda$ is the free space wavelength of the optical signal and $\eta$ is the index of refraction of the cladding. From this well-known equation, it can be seen that as $\Delta\eta$ increases, $a$ must decrease. In fact when $\Delta\eta = 0.02$ one finds $a \approx \lambda$. There are two problems associated with such small core sizes. The first is the practical problem of the mechanical precision necessary to align such small cores for splicing etc. The second problem is fundamental and is associated with non-linear optical effects such as stimulated Brillouin and Raman scattering, which occur when modest optical power (i.e., 10 mW) is confined to a very small cross-section (i.e., 1 $\mu$m square). If these non-linear effects occur, useful communication is precluded. A minimum core diameter of the order of about 3 micrometers is prescribed in view of these and other practical considerations. A maximum core diameter of less than 200 micrometers is prescribable to assure mechanical flexibility of the transmission line. The preferred core size is in the range of 30 to 100 micrometers.

The cladding thickness of a core-clad fiber optical waveguide must be sufficiently great that only a very small amount of optical energy from the guided modes penetrates all the way through the cladding to its outer surface. It may be presumed that a substantial fraction of the energy that does reach this outer surface will be lost by absorption due to interaction with surface contaminants or with an absorbing coating that is purposely applied to the fiber to avoid leakage of optical energy from one fiber into adjacent fibers in a bundle. Without such a coating, excessive crosstalk between fibers might occur. To avoid excessive optical loss and/or crosstalk, the cladding thickness must be greater than some minimum value. On the other hand, the overall diameter of the fibers must not be too large or the mechanical flexibility of the fiber will be lost.

For communication applications, the useful range of cladding thickness, $t$, is $$10\mu m \leq t \leq 250\mu m$$

while the preferred range is $$25\mu m \leq t \leq 100\mu m.$$

An optimum transmission line designed for many purposes known as GRIN (graded refractive index) is described in *Applied Optics*, Vol. 9, pp. 753–759, March 1970.

In the GRIN fiber design, the index of refraction varies parabolically with distance from the core axis. The desirable and well-known feature of the GRIN design is that all guided modes propagate with the same velocity, even in a highly multimode structure. Thus, the limitation due to Eq. (2) is no longer applicable and the GRIN fiber is inherently capable of very broad band transmission (as is the single mode fiber).

It is convenient to think of the core-clad fiber design as being the first approximation to the GRIN structure. A better approximation to the GRIN design results by using two or more cladding layers having indices of refraction which decrease with increasing radial distance from the fiber axis. Compositions for these multiple layers may be selected from the $SiO_2$—$B_2O_3$ system by reference to FIG. 1. During drawing of the fiber some mixing is expected to occur at the core-clad and clad-clad interfaces which tends to smooth out the abrupt discontinuities in index of refraction. This effect helps to improve the approximation to a parabolic distribution. Further enhancement may result from high temperature heat treatment of the fiber.

A GRIN type of fiber may also be made by varying the control parameters during chemical vapor deposition of $B_2O_3$-modified $SiO_2$ on a very thin silica core or during deposition in a tube.

7. Examples

A multimode fiber line of overall diameter approximating 100 $\mu$m is produced as follows: a rod shaped piece 3 mm in diameter made by the addition of 4 percent $Al_2O_3$ to a $3SiO_2:1B_2O_3$ glass composition serves as the core preform. This piece is inserted into a tube, 4 mm inside diameter and 7 mm outside diameter, of a similar but undoped borosilicate glass. The composite structure is locally heated at one end by an oxyhydrogen ring burner. The hot zone is contacted by a fused silica rod that is subsequently withdrawn with a thin fiber of the preform structure attached. This fiber is taped to a rotating take-up drum. The speed of rotation and the intensity of the oxyhydrogen flame is adjusted so that the final drawn fiber has an outside diameter of approximately 5 mils. The inner core diameter in this case is about 2 mils.

Such a line is capable of multimode transmission with an inherent insertion loss of less than approximately 1 dB/km within the wavelength range of from 0.8 $\mu$m to 1.1 $\mu$m. In the range of 0.6 $\mu$m to 0.8 $\mu$m the inherent insertion loss is less than 2 dB/km and at shorter wavelengths the loss increases.

What is claimed is:

1. Glass transmission line for the transmission of electromagnetic radiation within the wavelength range of from 0.5 to 2.0 $\mu$m, said line consisting essentially of a core member manifesting a first refractive index for said wave energy and a cladding about said core, said cladding including at least one layer having a second refractive index for said wave energy which is lower than the said first index, said second index being of a value at least 0.1 percent lower than said first index at least within a region in the neighborhood of a periphery of the said cladding, in which said core and said cladding are both primarily a mixed composition of $B_2O_3$ and $SiO_2$ with the $SiO_2/B_2O_3$ ratio being within the mole fraction range of from 30:1 to 2:1 and in which at least the innermost portion of the core contains sufficient additive material to result in a refractive index-increase for a wavelength within the said range of at least 0.1 percent, said additive being completely dissolved in the said mixture and having an index which is a maximum of 30 percent greater than that of the said mixture as unmodified by the said additive.

2. Transmission line of claim 1 in which the said additive material consists essentially of $Al_2O_3$ and in which the content of said additive within the innermost portion of the core region is from within the range of 1 to 20 percent based on the entirety of the said mixture.

3. Transmission line of claim 2 in which the $Al_2O_3$ content in the said core region is from 1 to 20 percent by weight based on the said mixture.

4. Transmission line of claim 2 in which the $Al_2O_3$ content in the said core region is from 1 to 10 percent by weight based on the said mixture.

5. Transmission line of claim 1 in which the said ratio is from 20:1 to 4:1.

6. Transmission line of claim 5 in which the said ratio is from 20:1 to 6:1.

7. Transmission line of claim 1 in which the core diameter as defined by a core region consisting essentially of 99.8 percent by weight $SiO_2$—$B_2O_3$—$Al_2O_3$ mixture with transition metal ion impurities no greater than $10^{-4}$ percent and having a maximum refractive index variation of 0.01 percent is from 3 $\mu$m to 200 $\mu$m 8. Transmission line of claim 7 in which the core diameter defining a region, the entirety of which contains $Al_2O_3$ in amount of at least 1 weight percent, is from 30 $\mu$m to 100 $\mu$m.

9. Transmission line of claim 7 in which the cladding thickness defined as the thickness of amorphous material, the composition of which is primarily $SiO_2/B_2O_3$ mixture containing no greater than 1 weight percent $Al_2O_3$ but within which the refractive index as a differential value relative to the said core greater than the variations specified in claim 7 is from 10 to 250 $\mu$m.

10. Transmission line of claim 9 in which the cladding thickness as defined is from 25 to 100 $\mu$m.

11. Transmission line of claim 10 in which the core dimension is within the range of from 3 $\mu$m to 200 $\mu$m.

12. Transmission line of claim 1 in which the refractive index differential between the said region and the core is from 0.0001 to 0.10.

13. Transmission line of claim 12 in which the refractive index differential between the said region and the core is from 0.001 to 0.02.

14. Transmission line of claim 1 in which the refractive index of the cladding is substantially uniform in the radial direction.

15. Transmission line of claim 1 in which the refractive index of the said cladding is graded with the index decrease in the radial direction away from the said core.

16. Transmission line of claim 1 in which the glass transition temperature of the said cladding material is equal to or greater than the glass transition temperature of the said core material.

* * * * *

UNITED STATES PATENT OFFICE
CERTIFICATE OF CORRECTION

PATENT NO. : 3,853,384
DATED : December 10, 1974
INVENTOR(S) : Douglas Arthur Pinnow and LeGrand Gerard Van Uitert It is certified that error appears in the above-identified patent and that said Letters Patent are hereby corrected as shown below:

Column 2, line 58, change "µ" to read --µm--.

Column 3, line 42, change "untraviolet" to read --ultraviolet--.

Column 5, line 5, change "usual" to read --useful--.

Signed and sealed this 17th day of June 1975.

(SEAL)
Attest:

RUTH C. MASON
Attesting Officer

C. MARSHALL DANN
Commissioner of Patents
and Trademarks